(12) United States Patent
Tingley

(10) Patent No.: US 9,936,707 B2
(45) Date of Patent: Apr. 10, 2018

(54) SEGMENTED INDUSTRIAL BAKING PAN

(75) Inventor: Jason Tingley, Enon, OH (US)

(73) Assignee: American Pan Company, Urbana, OH (US)

(*) Notice: Subject to any disclaimer, the term of this patent is extended or adjusted under 35 U.S.C. 154(b) by 874 days.

(21) Appl. No.: 12/892,162

(22) Filed: Sep. 28, 2010

(65) Prior Publication Data
US 2011/0072981 A1    Mar. 31, 2011

Related U.S. Application Data

(60) Provisional application No. 61/246,183, filed on Sep. 28, 2009.

(51) Int. Cl.
*A21B 3/13*    (2006.01)

(52) U.S. Cl.
CPC .............. *A21B 3/132* (2013.01); *A21B 3/134* (2013.01)

(58) Field of Classification Search
USPC ......... 99/407, 410, 426, 448, 450; 220/23.2, 220/23.4, 23.6, 23.83–23.9; D7/357
See application file for complete search history.

(56) References Cited

U.S. PATENT DOCUMENTS

| | | | |
|---|---|---|---|
| 2,305,014 A | 12/1942 | Langel | |
| 3,032,233 A | 5/1962 | Debs | |
| RE33,447 E | 11/1990 | Rosman | |
| 5,692,431 A * | 12/1997 | Herring | 99/426 |
| 2002/0000442 A1 * | 1/2002 | Howard et al. | 220/573.1 |
| 2008/0105139 A1 | 5/2008 | Kramer | |

OTHER PUBLICATIONS

International Search Report and Written Opinion received in PCT/US2010/050523.

* cited by examiner

*Primary Examiner* — Dana Ross
*Assistant Examiner* — Joe E Mills, Jr.
(74) *Attorney, Agent, or Firm* — Forst Brown Todd LLC

(57) ABSTRACT

A baking pan, including a plurality of baking subunits, wherein each baking subunit further includes two side portions and two end portions; a strap surrounding the baking subunits, wherein the strap further includes a first portion, wherein the top edge of the first portion is a adapted to cooperate with the top edges of the side portions and end portions of the baking subunits to form connections therewith and a second portion located beneath the first portion, wherein the strap is attached to the exterior of the baking subunits within the second portion; and a plurality of joining members located between the baking subunits, wherein each joining member further includes end portions that are adapted to cooperate with the top edges of the side portions of the baking subunits to form connections therewith.

20 Claims, 6 Drawing Sheets

SEGMENTED INDUSTRIAL BAKING PAN

CROSS-REFERENCE TO RELATED APPLICATIONS

This patent application claims the benefit of U.S. Provisional Patent Application Ser. No. 61/246,183 filed on Sep. 28, 2009 and entitled "Bread Pan," the disclosure of which is hereby incorporated by reference herein in its entirety and made part of the present U.S. utility patent application for all purposes.

BACKGROUND OF THE INVENTION

The present invention relates generally to an article of manufacture used for industrial baking applications, and more specifically to a baking pan for use in industrial and commercial applications. This baking that includes various unique structural reinforcements and well as a variety of features that make the pan both stronger and lighter in weight than prior art bread pans. Current baking pans and trays are typically quite large and heavy and suffer from certain structural weaknesses that shorten their useful life. The present invention overcomes these deficiencies by providing a lighter-weight, durable and long-lasting industrial baking pan.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a baking pan for bread and the like is provided. This baking pan includes a plurality of baking subunits, wherein each baking subunit further includes two side portions and two end portions; a strap surrounding the baking subunits, wherein the strap further includes a first portion, wherein the top edge of the first portion is a adapted to cooperate with the top edges of the side portions and end portions of the baking subunits to form connections therewith and a second portion located beneath the first portion, wherein the strap is attached to the exterior of the baking subunits within the second portion; and a plurality of joining members located between the baking subunits, wherein each joining member further includes end portions that are adapted to cooperate with the top edges of the side portions of the baking subunits to form connections therewith.

In accordance with another aspect of the present invention, a segmented metal baking pan is provided. This baking pan includes a plurality of baking subunits positioned adjacent to one another lengthwise, a metal strap surrounding the baking subunits, and plurality of joining members located between the side portions of the adjacent baking subunits. Each baking subunit further includes a bottom portion; two side portions extending upward from the bottom portion; and two end portions extending upward from the bottom portion. The strap further includes a first portion, wherein the top edge of the first portion is a adapted to cooperate with the top edges of the side portions and end portions of the baking subunits to form a first lock seam; and a second portion located beneath the first portion, wherein the second portion further includes a plurality of indentations, and wherein the strap is attached to the exterior of the baking subunits within the indentations. Each joining member further includes two end portions, wherein the terminus of each end portion is adapted to cooperate with the top edges of the side portions of the baking subunits to form a second lock seam.

In yet another aspect of this invention, a segmented baking pan is provided. This baking pan includes a plurality of baking subunits positioned adjacent to one another lengthwise, a metal strap surrounding the baking subunits, and plurality of joining members located between the side portions of the adjacent baking subunits. Each baking subunit further includes a bottom portion; two side portions extending upward from the bottom portion, wherein the upper edge of the side portions are rolled downward to form a lip, and wherein the lip defines a hollow channel therein; and two end portions extending upward from the bottom portion, wherein the upper edges of the end portions are rolled downward to form a lip, and wherein the lip defines a hollow channel therein. The strap further includes a first portion, wherein the top edge of the first portion is rolled downward to form a lip, and wherein the lip is positioned within the channels defined by the lips on the side portions and end portions of the baking subunits to form a first lock seam; a second portion located beneath the first portion; a third portion located beneath the second portion and recessed therefrom, wherein the third portion further includes a plurality of indentations, and wherein the strap is attached to the exterior of the baking subunits within the indentations; and a fourth portion located beneath the third portion. Each joining member further includes two side portions; a middle portion; and two end portions, wherein the terminus of each end portion is rolled upward to form a lip, and wherein these lips engage the lips formed on the side portion of each baking subunit to form a second lock seam.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1:
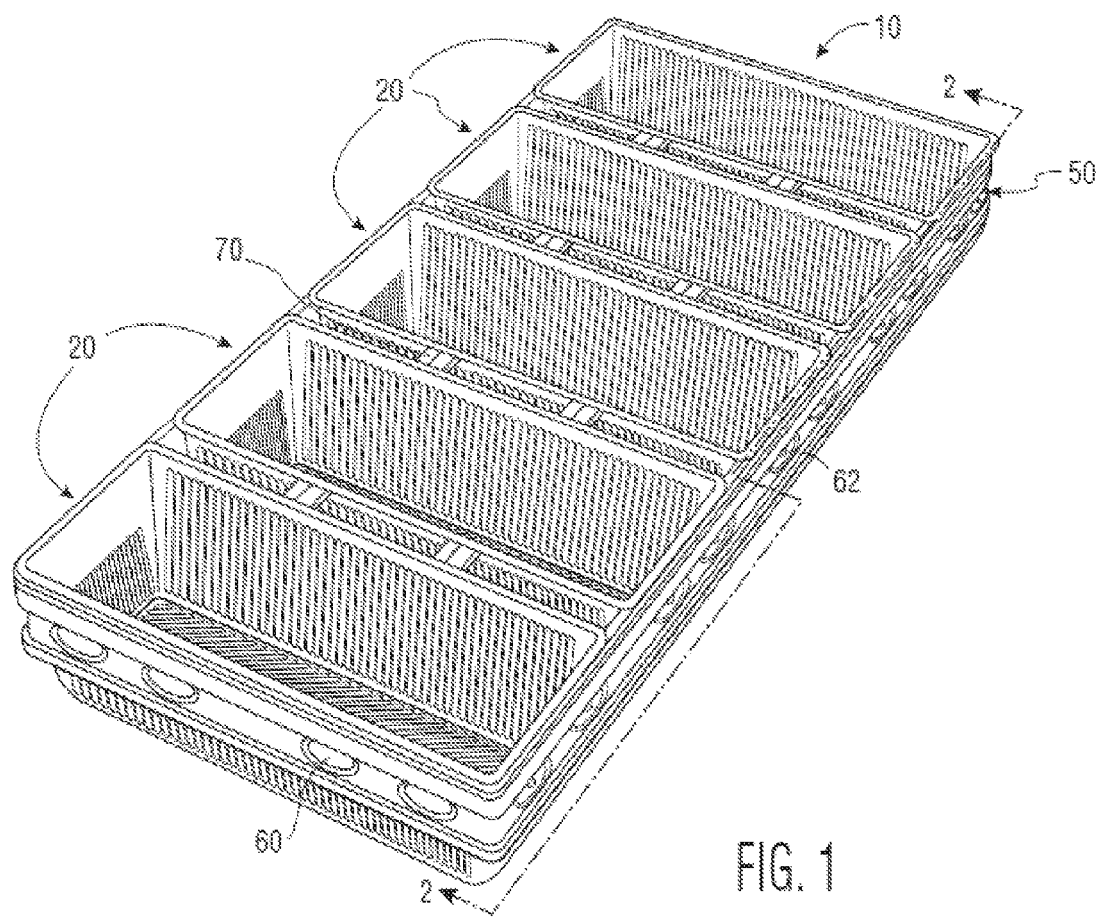
FIG. 1 is a front perspective view of an exemplary embodiment of the baking pan of the present invention illustrating the various structural features thereof.

Exemplary embodiments of the present invention are now described with reference to the Figures. Reference numerals are used throughout the detailed description to refer to the various elements and structures. In other instances, well-known structures and devices are shown in block diagram form for purposes of simplifying the description. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention relates to a metal industrial baking pan or tray for bread and the like. This bread pan includes design features that provide the pan with significant structural support, but that reduce the overall weight of the pan itself compared to prior art pans used for the same purpose. The baking pan of the present invention, referred in some instances as the ePan, includes significantly less steel and/or other metals than prior art pans. As previously indicated, a first general embodiment of this invention provides a light weight baking pan; a second general embodiment of this invention provides a segmented baking pan; and a third general embodiment of this invention also provides a segmented baking which is lighter in weight than prior art trays or pans used for similar purposes. With reference now to the Figures, one or more specific embodiments of this invention shall be described in greater detail.

Figure 4:
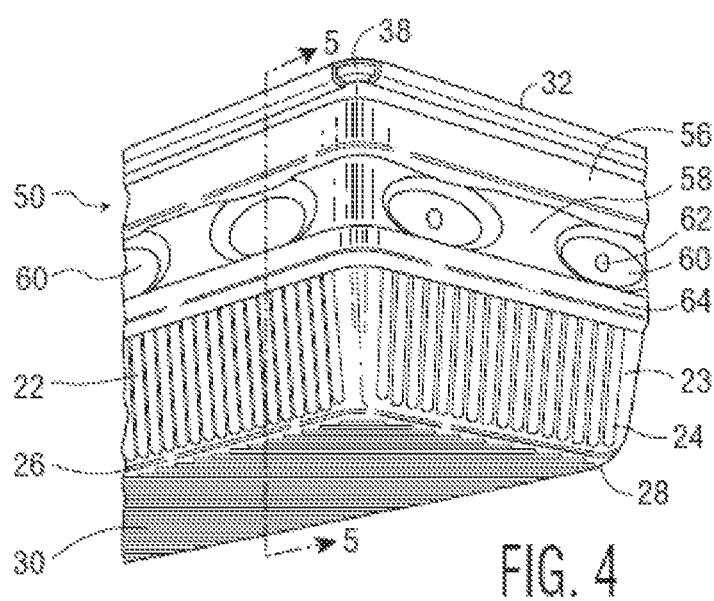
FIG. 4 is a bottom perspective view of the exterior of a portion of the baking pan of FIG. 1 showing the placement of the strap around the exterior of the baking subunits as well as the location of the spot welds that attach the strap to the exterior of the baking subunits.
Figure 5:
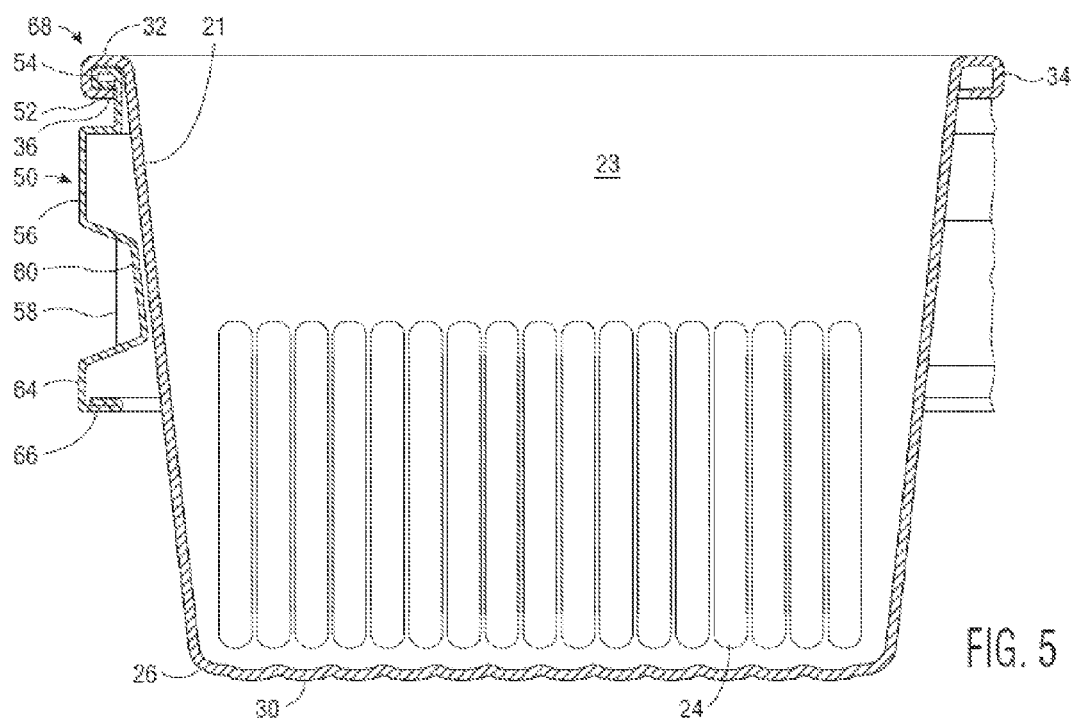
FIG. 5 is a cross-sectional end view of one of the baking subunits of the baking pan of FIG. 1 showing the attachment of the strap to the exterior of the baking subunit.
Figure 6:
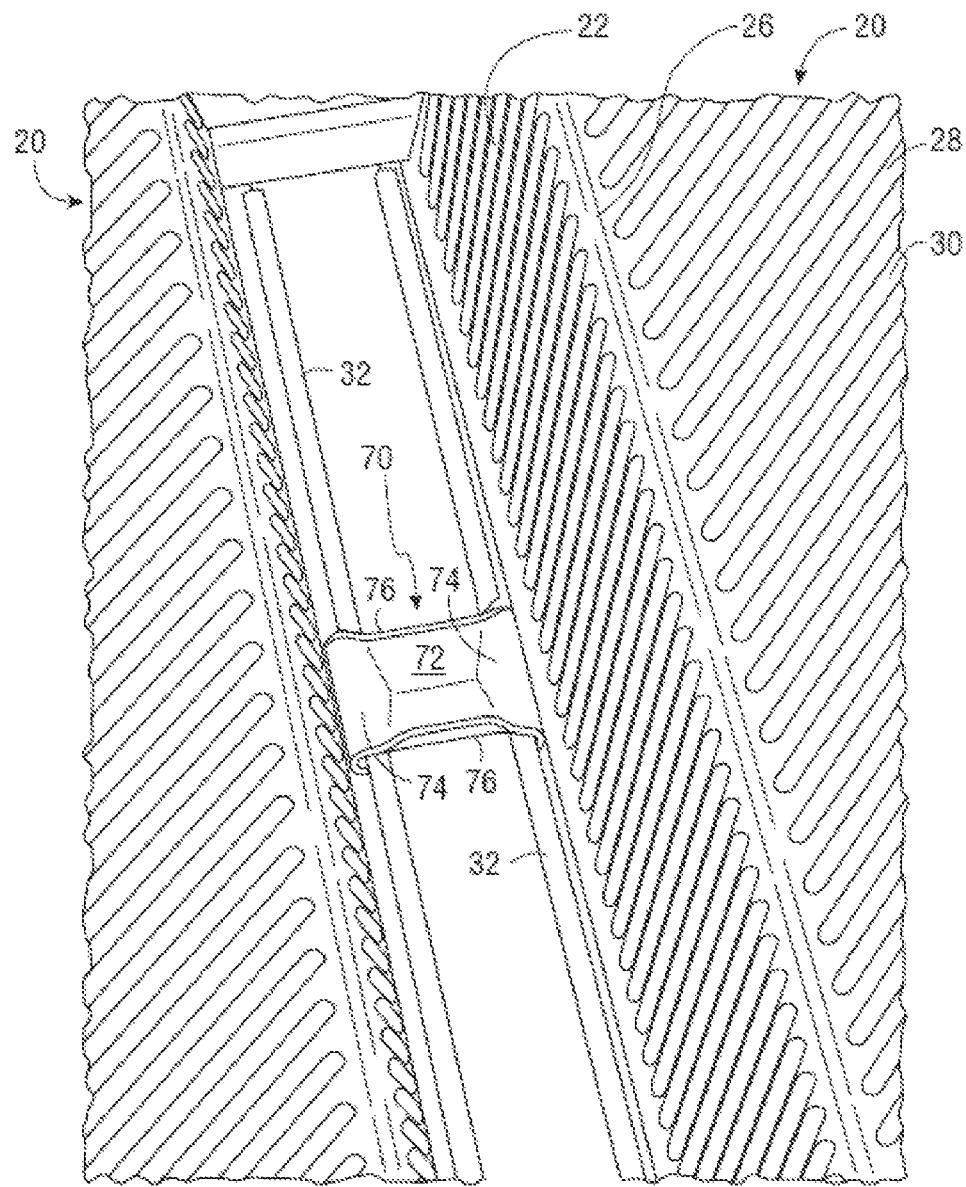
FIG. 6 is bottom perspective view of two of the baking subunits of the baking pan of FIG. 1 showing a joining member connecting one baking subunit to another baking subunit.
Figure 7:
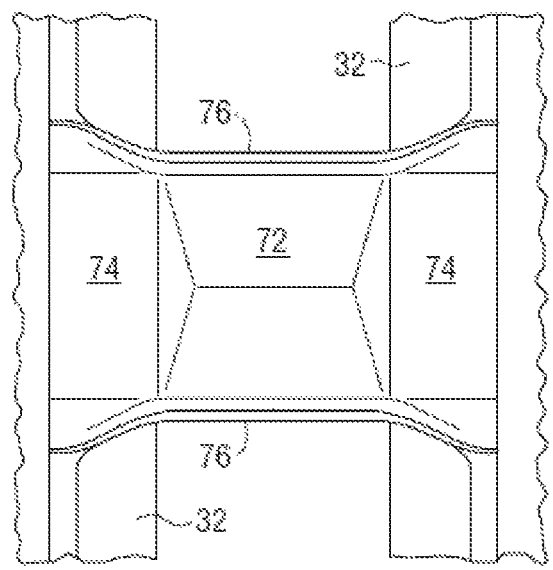
FIG. 7 is a bottom view of one of the joining members.
Figure 8:
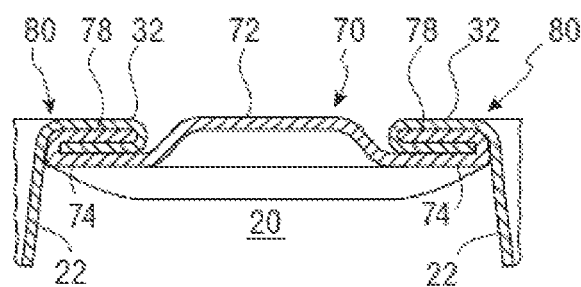
FIG. 8 is a cross-sectional view of one joining members along its longitudinal axis.
Figure 9:
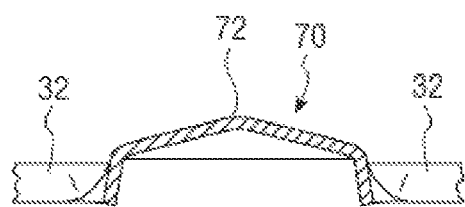
FIG. 9 is a cross-sectional view of one joining members along its transverse axis.

As shown in FIGS. 1-9, an exemplary embodiment of the present invention provides a baking pan for use in industrial, i.e., large-scale, baking operations. As best shown in FIGS. 1-4, baking pan 10 includes a plurality of rectangular baking subunits 20 that are arranged adjacent to one another in a lengthwise manner and that are typically manufactured from aluminized steel. Each baking subunit 20 further includes two sidewalls 21 and two end walls 23 that extend upward from bottom portion 28 along bottom edge 26. In this embodiment, bottom portion 28 has a relatively small radius. In the exemplary embodiment, a plurality of adjacent vertical ribs 22 are formed in each sidewall and a plurality of adjacent vertical ribs 24 are formed in each end wall of each baking subunit 20 to form a corrugated pattern that confers strength and rigidity to baking pan 10. Likewise, a plurality of adjacent diagonal ribs 30 are formed in bottom portion 28 of each baking subunit 20 also to confer strength and rigidity to baking pan 10. As best shown in FIGS. 4-5, the top edges of sidewalls 21 and end walls 23 are rolled down to form a squared lip 32, which defines a hollow channel 34 therein. The design of this channel eliminates the need for the steel support wire that is typically placed around the perimeter of baking pans of this type, thus reducing the overall weight of baking pan. On each baking subunit 20, the corners of lip 32 further include a cutaway portion 38.

Figure 2:
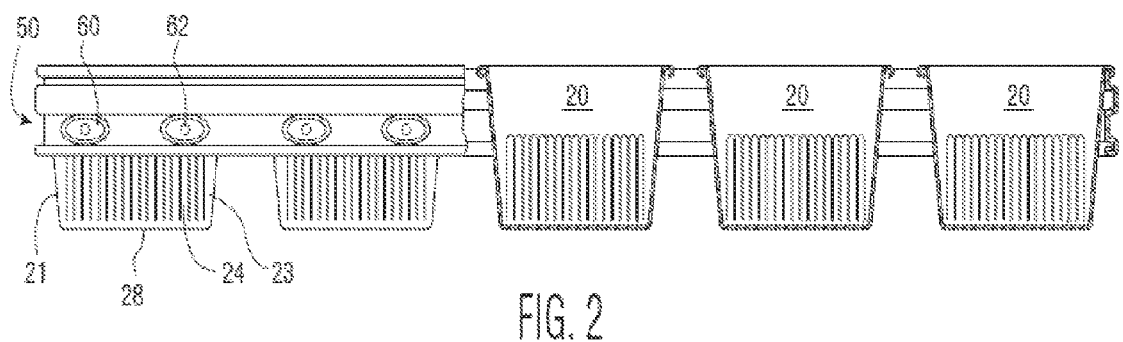
FIG. 2 is a side view of the baking pan of FIG. 1, wherein a portion of the strap has been removed to show the appearance of the baking subunits.
Figure 3:
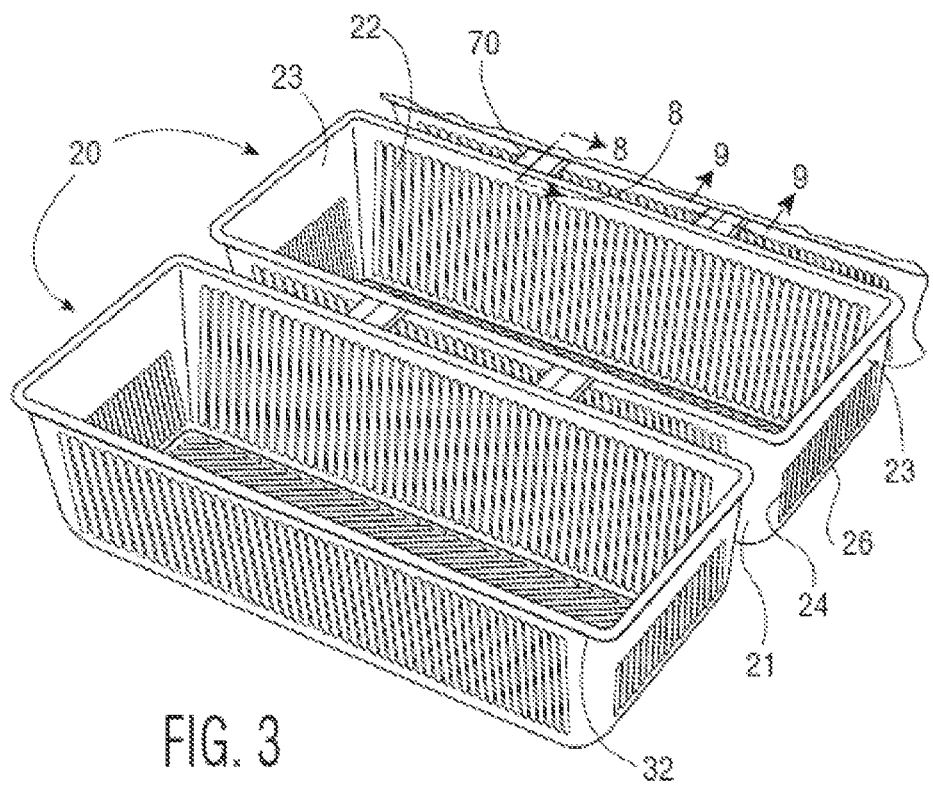
FIG. 3 is a top perspective view of the two of the baking subunits of the baking pan of FIG. 1 showing the placement of the joining members between the baking subunits.

As best shown in FIGS. 1-2 and 4, a stamped metal strap 50 surrounds the outer surfaces of baking subunits 20 and binds baking subunits 20 together into a segmented but unitary baking pan. In the exemplary embodiment shown in the Figures, strap 50 is contoured and includes first portion 52, second portion 56, third portion 58, and fourth portion 64, which further includes bottom lip 66. First portion 52 of strap 50 includes a rolled-down upper lip 54 (see FIG. 5), which is positioned within channel 34 and secured by terminus 36 of lip 32 to form exterior lock seam 68, which adds additional structural stability to the entire pan assembly. Third portion 58 of strap is recessed from second portion 56 and fourth portion 64 and includes a plurality of oval-shaped indentations 60. At least one spot weld 62 is formed within certain indentations 60 (typically on end walls 23) for attaching strap 50 to the outside surfaces of baking subunits 20. Other permanent attachment means are possible with this invention such as, for example, rivets.

As best shown in FIGS. 6-9, a series of joining members 70 (also referred to as "rim spans") are positioned between each of the individual baking units 20 in baking pan 10 for connecting the individual baking subunits 20 to one another and for providing structural support to the interior portion of baking pan 10. Each joining member 70 includes a raised middle portion 72, two end portions 74, and two side portions 76. The terminus 78 of each end portion 74 is rolled upward and engages the portion of lip 32 that is formed on sidewalls 21 to form interior lock seam 80. The side portions 76 are partially "pinched" or crimped together to further secure each joining member 70 to the baking subunits that it connects. The individual portions of the present invention are manufactured and assembled according to manufacturing and fabrication techniques known to those of ordinary skill in the art.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A baking pan, comprising:
   (a) a plurality of baking subunits, wherein each baking subunit further includes:
     (i) two side portions; and
     (ii) two end portions; and
   (b) a strap surrounding the baking subunits, wherein the strap further includes:
     (i) an upper portion, wherein the top edge of the an upper portion is adapted to cooperate with the top edges of the side portions and end portions of the baking subunits to form permanent connections therewith; and
     (ii) a lower portion located beneath the upper portion, wherein a plurality of points of permanent attachment between the exterior of the baking subunits and the strap are located within the lower portion of the strap; and (c) a plurality of joining members located between and perpendicular to the baking subunits, wherein each joining member further includes end portions that are adapted to cooperate with the top edges of the side portions of the baking subunits to form permanent connections therewith.

2. The baking pan of claim 1, wherein each baking subunit further includes a bottom portion, and wherein a plurality of diagonally oriented ribs are formed in the bottom portion.

3. The baking pan of claim 1, wherein the end portions and side portions of each baking subunit further include a plurality of vertically oriented ribs formed therein.

4. The baking pan of claim 1, wherein the strap is attached to the exterior of the baking subunits by a plurality of spot welds.

5. The baking pan of claim 1, wherein the first portion of the strap cooperates with the top edges of the side portions and end portions of the baking subunits to form a lock seam therewith.

6. The baking pan of claim 1, wherein each joining member cooperates with the top edges of the side portions of each baking subunit to form a lock seam therewith.

7. The baking pan of claim 1, wherein each joining member further includes a middle portion and wherein the middle portion of each joining member is inwardly pinched to further secure the joining member in place between the baking subunits.

8. The baking pan of claim 1, wherein all components of the baking pan are manufactured from metal.

9. A segmented baking pan, comprising:
(a) a plurality of baking subunits positioned adjacent to one another lengthwise, wherein each baking subunit further includes:
  (i) a bottom portion;
  (ii) two side portions extending upward from the bottom portion; and
  (iii) two end portions extending upward from the bottom portion; and
(b) a strap surrounding the baking subunits, wherein the strap further includes:
  (i) an upper portion, wherein the top edge of the an upper portion is a adapted to cooperate with the top edges of the side portions and end portions of the baking subunits to form a first lock seam; and
  (ii) lower portion located beneath the upper portion, wherein the lower portion further includes a plurality of indentations formed therein, and wherein an attachment point between the exterior of the baking subunits and the strap is located within each indentation; and
(c) a plurality of joining members located between and perpendicular to the side portions of the adjacent baking subunits, wherein each joining member further includes:
  (i) two end portions, wherein the terminus of each end portion is adapted to cooperate with the top edges of the side portions of the baking subunits to form a second lock seam.

10. The baking pan of claim 9, wherein the bottom portion of each baking subunit further includes a plurality of diagonally oriented ribs are formed therein.

11. The baking pan of claim 9, wherein the end portions and side portions of each baking subunit further include a plurality of vertically oriented ribs formed therein.

12. The baking pan of claim 9, wherein the strap is attached to the exterior of the baking subunits by a plurality of spot welds.

13. The baking pan of claim 9, wherein the middle portion of each joining member is crimped to further secure the joining member in place between the baking subunits.

14. The baking pan of claim 9, wherein all components of the baking pan are manufactured from metal.

15. A segmented baking pan, comprising:
(a) a plurality of baking subunits positioned adjacent to one another lengthwise, wherein each baking subunit further includes:
  (i) a bottom portion;
  (ii) two side portions extending upward from the bottom portion, wherein the upper edge of the side portions are rolled downward to form a lip, and wherein the lip defines a hollow channel therein; and
  (iii) two end portions extending upward from the bottom portion, wherein the upper edges of the end portions are rolled downward to form a lip, and wherein the lip defines a hollow channel therein; and
(b) a strap surrounding the baking subunits, wherein the strap further includes:
  (i) a first portion, wherein the top edge of the first portion is rolled downward to form a lip, and wherein the lip is positioned within the channels defined by the lips on the side portions and end portions of the baking subunits to form a first lock seam;
  (ii) a second portion located beneath the first portion;
  (iii) a third portion located beneath the second portion and recessed therefrom, wherein the third portion further includes a plurality of indentations formed therein, and wherein an attachment point between the exterior of the baking subunits and the strap is located within each indentation; and
  (iv) a fourth portion located beneath the third portion; and
(c) a plurality of joining members located between and perpendicular to the side portions of the adjacent baking subunits, wherein each joining member further includes:
  (i) two side portions;
  (ii) a middle portion; and
  (iii) two end portions, wherein the terminus of each end portion is rolled upward to form a lip, and wherein these lips engage the lips formed on the side portion of each baking subunit to form a second lock seam.

16. The baking pan of claim 15, wherein the bottom portion of each baking subunit further includes a plurality of diagonally oriented ribs are formed therein.

17. The baking pan of claim 15, wherein the end portions and side portions of each baking subunit further include a plurality of vertically oriented ribs formed therein.

18. The baking pan of claim 15, wherein the strap is attached to the exterior of the baking subunits by a plurality of spot welds.

19. The baking pan of claim 15, wherein the middle portion of each joining member is crimped to further secure the joining member in place between the baking subunits.

20. The baking pan of claim 15, wherein all components of the baking pan are manufactured from metal.

* * * * *